United States Patent Office 3,647,824
Patented Mar. 7, 1972

3,647,824
SUBSTITUTED FUROIC ACIDS AND
ESTERS THEREOF
Michael Elliott, Harpenden, England, assignor to National Research Development Corporation, London, England
No Drawing. Division of application Ser. No. 807,406, Mar. 14, 1969, now Patent No. 3,542,928, which is a division of application Ser. No. 598,923, Dec. 5, 1966, now Patent No. 3,465,007. Divided and this application Sept. 17, 1969, Ser. No. 870,779
Int. Cl. C07d 5/28, 5/16
U.S. Cl. 260—347.5                    3 Claims

ABSTRACT OF THE DISCLOSURE

Insecticidal compositions are produced wherein the active ingredient is at least one compound of the formula

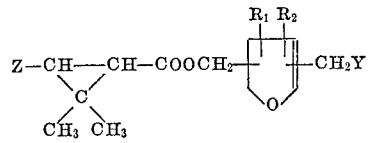

in which Z represents an aryl, alkenyl or carboalkoxyalkenyl group, Y represents a hydrogen atom or an alkyl, alkenyl or alkadienyl group or an aryl group or a heterocyclic group which themselves may be substituted by alkyl, alkenyl, alkadienyl or alkoxy groups or halogen atoms, and $R_1$ and $R_2$ which may be the same or different, each represent a hydrogen atom or an alkyl, alkenyl or alkadienyl group. Furoic acids and furoic acid lower alkyl esters are also disclosed.

This application is a divisional of copending application 807,406, filed Mar. 14, 1969, now U.S. Pat. 3,542,-928, which is a divisional of application Ser. No. 598,923 filed Dec. 5, 1966 now U.S. Pat. 3,465,007.

This invention relates to new insecticidal derivatives of chrystanthemic and related acids, and to processes for their preparation.

The naturally occurring insecticide pyrethrum, obtained from the flower heads of *Chrystantheumum cinerariaefolium* and related species, is now a well established insecticide having a range of desirable biological properties, including a high insecticidal toxicity, and rapid knockdown effect, coupled with low mammalian toxicity, and in its combination of favorable properties is superior to many synthetic insecticides which have become available. Unfortunately, however, natural pyrthrum is rather unstable in many formulations in common use and furthermore does not form a sufficiently persistent insecticidal film on all the materials and surfaces to which it needs to be applied in practice. It is also expensive and economic factors could make it in short supply.

Much work has been done, therefore, in an attempt to prepare synthetic insecticides having a combination of desirable biological and physical properties such as high toxicity to insects and very low mammalian toxicity, and this investigation has been facilitated by the determination of the structure of six related esters in natural pyrethrum. A number of esters of the so-called chrystanthemic and pyrethric acids and their derivatives have been prepared, notably allethrin, but even allethrin is inferior in many respect to the natural pyrethrum and it is also difficult and expensive to prepare. At present the use of the pyrethrins and their synthetic relatives is largely restricted to household and industrial application because of their instability and high price.

It is therefore still desirable to have synthetic pyrethroids available having, in addition to high insecticidal activity, rapid knock-down effect and lack of mammalian toxicity, a higher stability and good weather resistance.

The present invention comprises new compounds of the general formula

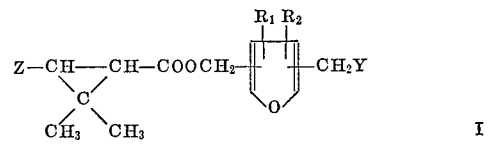

in which Z represents an aryl, alkenyl or carboalkoxyalkenyl group, Y represents a hydrogen atom or an alkyl, alkenyl or alkadienyl group or an aryl group or a heterocyclic group which themselves may be substituted by alkyl, alkenyl, alkadienyl or alkoxy groups or halogen atoms, and $R_1$ and $R_2$ which may be the same or different, each represent a hydrogen atom or an alkyl, alkenyl or alkadienyl group.

It will be seen that the compounds of the invention may be regarded as derivatives of cyclopropane carboxylic acids of the general formula.

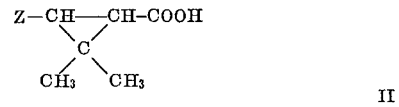

and derivatives of these acids where Z represents an isobutenyl group or a 2-carbomethoxy-prop-1-enyl group, i.e., derivatives of chrysanthemic acid or pyrethric acid respectively, have been found to be particularly active. Acids of the Formula II can exhibit optical and geometrical isomerism, the various isomers producing compounds of varying insecticidal activity, and it is preferred to use the isomer producing the compound of greatest activity. Thus in the case of chrysanthemic and pyrethric acids it is found that the (+)-trans acids, obtained from natural pyrethrum produce more active compounds than their synthetic counterparts, the (±)-cis-trans isomers, which nevertheless still produce valuable insecticides.

Other useful insecticides of the Formula I may be obtained from 2,2-dimethyl-cyclopropane carboxylic acid substituted in the 3 position by other alkenyl groups or by aryl groups for example a phenyl group.

The compounds of the invention are essentially substituted furylmethyl esters containing from 1 to 3 further substituents in the furan ring. In general it is found that compounds in which the furan ring is linked to the ester group through 3 position i.e. a 3-furylmethyl compound have a greater insecticidal activity than the corresponding compounds in which the ring is linked through 2 position i.e. furfuryl compounds and in such compounds it is often found that high insecticidal activity is associated with a substituent being present in the 5 position on the furan ring, although this is not true in all cases. A $C_1$ to $C_4$ alkyl substituent in a 2 position e.g. a methyl group sometimes enhances the activity of 3-furylmethyl esters.

Thus, the substituent $CH_2Y$ is preferably present in the 5 position in the 3-furylmethyl compounds and Y preferably represents a benzenoid ring system, for example a phenyl group so that $CH_2Y$ represents a benzyl group. Such benzenoid ring systems may be further ring substituted e.g. by alkyl or alkoxy groups containing up to 4 carbon atoms e.g. methyl or methoxy groups or by chlorine atoms. Other active compounds are obtained when Y represents a hydrogen atom, an alkyl group containing up to 4 carbon atoms, an alkenyl group containing up to 4 carbon atoms, e.g. vinyl so that $CH_2Y$ represents an allyl group, an alkadienyl group containing up to 4 carbon atoms or a heterocyclic group such as another furan ring.

The insecticidal activity of the esters often tends to decrease as the degree of substitution in the furan ring linked with the ester group increases except when the substituent is methyl. Apart from this exception mono substituted furfuryl esters tend to be more active than the corresponding poly substituted furfuryl esters but the reduction in activity is often only slight and may be accompanied by more desirable physical properties. Where such further substituents are present they may contain up to 4 carbon atoms.

The preferred esters of those series have been derived from chrysanthemic and pyrethric acids and 5-benzyl-furfuryl alcohol, 5-benzyl-3-furyl methyl alcohol, 5-benzyl-2-methyl-3-furyl methyl alcohol, 5-methyl-4-benzyl-furfuryl alcohol, 5-p-xylyl-furfuryl alcohol, 2,4,5-trimethyl-3-furyl methyl alcohol and 4,5-dimethyl-furfuryl alcohol.

The compounds of the invention may be prepared by any of the methods customarily used for the preparation of esters and the reactants may be represented generically by the formulae

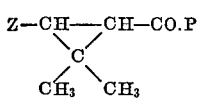 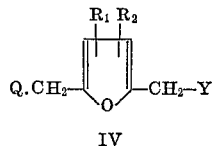

III  IV where CO·P and Q represent functional groups which react together to give an ester linkage.

Thus esters may be prepared by reacting a furfuryl alcohol with the cyclo-propane carboxylic acid or acid anhydride or more preferably, with its acid halide, for example, by treating the reactants in a solvent in the presence of a hydrogen halide acceptor such as pyridine.

A useful alternative method involves the treatment of a furfuryl halide with a silver salt of the cyclo-propane carboxylic acid; in this method a rather purer product is obtained and the silver is of course recoverable for further use. This method may be modified to avoid the need for a silver salt by reacting the furfuryl halide with a triethylamine salt of the cyclopropane acid. This salt may be prepared in situ by reacting equimolar quantities of the acid and triethylamine.

The esters of the invention may also be prepared by a transesterification process using for example a lower alkyl ester of the cyclopropane acid (containing 1 to 4 carbon atoms in the lower alkyl group) and a furylmethyl alcohol. This transesterification may be carried out in the presence of an alkali metal such as sodium or alkali metal alkoxide such as sodium ethoxide.

One or more of the insecticidal esters of the invention may be formulated with an inert carrier or diluent to give insecticidal compositions and they may be prepared for example, in the form of dusts and granular solids, mosquito coils, wettable powders, emulsions, sprays and aerosols after addition of appropriate solvents, diluents and surfactants.

In common with pyrethrum and synthetic pyrethroids the compounds of the invention may be synergised for example, with piperonyl butoxide or with other well known pyrethrum synergists.

The insecticidal compositions described above may be used for killing insects on a domestic or agricultural scale by treating the insects themselves where insect infestation has already taken place or by treating an environment susceptible to insect attack with the composition as a preventive measure.

5-substituted-3-furylmethyl esters of the general Formula I may be prepared as described above from the correspondingly substituted 3-furylmethyl alcohol. Such alcohols are new compounds and are represented by the general formula:

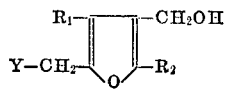

V when Y represents an alkyl, alkenyl or alkadienyl group or an aryl group or a heterocyclic group which themselves may be substituted by alkyl, alkenyl, alkadienyl alkoxy groups or halogen atoms and $R_1$ and $R_2$, which may be the same or different, each represent a hydrogen atom or an alkyl, alkenyl or alkadienyl group. It has been found that amongst the most active chrysanthemic acid esters are those derived from alcohols of the above formula in which $R_1$ and $R_2$ each represent a hydrogen atom and Y represents a phenyl group, i.e. 5-benzyl-3-furylmethyl alcohol and such an alcohol represents a preferrel compound of the present invention. Other alcohols that are of interest include 5 - benzyl-2-methyl-3-furylmethyl alcohol, 2-methyl-3-furylmethyl alcohol, 5-methyl-3-furylmethyl alcohol, 2,5-dimethyl-3-furylmethyl alcohol, 5-(3 - furylmethyl) - 3-furylmethyl alcohol, 5-furfuryl-3-furylmethyl alcohol and 5-allyl-3-furylmethyl alcohol.

The alcohols of Formula V may be prepared by reducing the correspondingly substituted 3-furoic acid or the carboalkoxy group in the correspondingly substituted 3-furoic acid ester. For example, a metal hydride such as lithium aluminum hydride specifically reduces ester groups to hydroxymethyl groups under mild reaction conditions and it is particularly useful in cases where other reducible groups are present in the molecule. This reduction proceeds at an acceptable rate at about room temperature or a little above in a low boiling organic solvent such as ether and the alcohol may be recovered in good yield in a sufficiently pure state for immediate esterification. Alternatively the carboalkoxy group may be hydrogenated catalystically.

The necessary 5-substituted 3-furoic acid ester may be prepared from 3-furoic acid. For example, 5-benzyl-3-furylmethyl alcohol may be prepared by esterifying 3-furoic acid, chloromethylating the alkyl 3-furoate in the presence of zinc chloride, reacting the resulting 5-chloromethyl compound with benzene in the presence of aluminum trichloride to introduce the 5-benzyl group and finally reducing the carboalkoxy group to a hydroxymethyl group, for example with lithium aluminum hydride. Analogous alcohols of Formula V may be similarly prepared by using an appropriately substituted furoic acid or by using an appropriate reagent with the 5-chloromethyl compound.

The following examples are given to illustrate the invention. Temperatures are in ° C.

EXAMPLE 1

Preparation of the alcohol, 5-benzyl-3-furfuryl alcohol tetracarboxyfuran

Bromine (19 ml.) in chloroform is added over 1 hr. to ethyl sodiooxalacetate (175 g.) in chloroform (400 ml.) at 0–10°. After washing the water (4×300 ml.) the chloroform solution is dried ($Na_2SO_4$) and evaporated. The residues from four such experiments after recrystallization from ethanol (800 ml.) at —20° gives the required product (317 g.). Concentration of the mother liquor and cooling to —20° gives a further 80 g. of product. Total yield 397 g. (63%) M.P. 79°.

The above tetracarboxylate (100 g.) is added with stirring during 5 minutes to sulphuric acid (300 ml.). After being heated to 50° for 5 minutes, the product is cooled to room temperature and added to ice (1000 g.). The combined product from 4 such experiments is taken into ether (2+1 litre). The ether is washed twice with saturated sodium chloride solution, dried ($Na_2SO_4$) and evaporated. The residue is refluxed with glacial acetic acid (600 ml.) constant boiling hydrobromic acid (400 ml.) and water (200 ml.) for 5 hr. and then evaporated. The residue is recrystallized from acetic acid (350 ml.) and chloroform (600 ml.) then washed with chloroform and dried in vacuo. Yield, 216 g., M.P. 233–238° (decomp.).

3-furoic acid

Tetracarboxy furan (20 g.) is heated with copper powder (1 g.) in a fused salt bath. Evolution of carbon dioxide is controlled by removal of the heating bath when necessary (temperature 250–290°). At 290° this product (5.8 g.) distills. Repetition gives a total of 40 g. of product which is recrystallized from water to give pure acid (30 g.) M.P. 114–118°.

Methyl-3-furoate 3-furoic acid (41.5 g.) is refluxed with methanol (190 ml.) and sulphuric acid (3.75 ml.) for four hours. Most of the methanol is evaporated, the residues poured into water and the ester taken into ether. After washing (saturated potassium hydrogen carbonate, and saturated sodium chloride) and drying ($Na_2SO_4$) the solvent is evaporated and the product distilled, B.P. 80°/30 mm., $n_D^{20}$ 1.4640 (33 g.).

Methyl 5-chloromethyl 3-furoate

Dry hydrogen chloride is passed into a mixture of methyl 3-furoate (15 g.) paraformaldehyde (4.2 g.) and zinc chloride (4.2 g.) in chloroform (90 ml.) maintained at 20–25° for 1½ hrs. The product is shaken with water, more chloroform added and the combined organic layers washed ($3 \times H_2O$) dried ($Na_2SO_4$) and evaporated. Distillation of the residue give methyl 5-chloromethyl 3-furoate (9.4 g.) B.P. 80–108° $n_D^{20}$ 1.5003–1.5072, M.P. 42–51°.

Methyl 5-benzyl-3-furoate

Aluminum trichloride (9.84 g., freshly sublimed) is added with stirring to methyl 3-chloromethyl 3-furoate (10.9 g.) in benzene while the temperature is maintained below 20° for 50 minutes. Water (100 ml.) is added dropwise with cooling (to below 30°) and the product taken up in ether, washed twice with 10% sodium hydroxide and twice with sodium chloride and finally dried ($Na_2SO_4$) evaporated and distilled. The methyl 5-benzyl-3-furoate (8.7 g.) has B.P. 127–135°/0.4 mm., M.P. 52–53°.

5-benzyl-3-furfuryl alcohol

Methyl 5-benzyl-3-furoate (6.64 g.) in dry ether (90 ml.) is added dropwise to lithium aluminum hydride (1.35 g.) in ether (135 ml.). The mixture is then warmed on steam, cooled and decomposed by addition of water. The ethereal solution is dried ($Na_2SO_4$), evaporated, and distilled to give 5-benzyl-3-furfuryl alcohol (4.84 g.) B.P. 151–156°/1.5 mm., M.P. 36–39°.

Similarly prepared by lithium aluminum hydride reduction of the appropriate ester were 5-methyl-3-furylmethyl alcohol, B.P. 84–85°/10 mm., $n_D^{20}$ 1.4797 and 5-benzyl-2-methyl-3-furylmethyl alcohol, B.P. 155–160°/0.1 mm., $n_D^{20}$ 1.5510.

EXAMPLE 2

Esterfication of the alcohol 5-benzyl-3-furylmethyl alcohol (1.1 mol. prop.) as a 10% solution in ether is added with cooling and stirring to (±)-cis-trans chrysanthemoyl chloride (1.0 mol. prop.) as a 10% solution in benzene. Pyridine (1.0 mol. prop.) is added and the mixture set aside overnight. Water is then added to the organic layer, which is washed with dilute sulphuric acid, with saturated aqueous potassium hydrogen carbonate and twice with saturated sodium chloride and is finally dried, evaporated and distilled to give 5-benzyl-3-furylmethyl - (±) - cis-trans-chrysanthemate, B.P. 169–172°/2.5×$10^{-2}$ mm., $n_D^{20}$ 1.5305.

5 - benzyl - 3 - furylmethyl - (+) - trans - chrystanthemate, B.P. 174°/8×$10^{-4}$ mm., $n_D^{20}$ 1.5346; (±)-trans-chrysanthemate, M.P. 54–55° and (+)-trans-pyrethrate, B.P. 206°/8×$10^{-3}$ mm. are similarly prepared using the appropriate isomer of chrysanthemoyl or pyrethroyl chloride:

The following esters are similarly prepared by esterifying the corresponding alcohol by the general procedure described in Example 1B, above.

(±)-cis-trans-chrysanthemates
3-methylfurfuryl, B.P. 101–105°/$10^{-2}$ mm., $n_D^{20}$ 1.4944
2-methyl-3-furylmethyl, B.P. 110°/$10^{-2}$ mm., $n_D^{20}$ 1.4942
5-methylfurfuryl, B.P. 97–101°/8×$10^{-3}$ mm., $n_D^{20}$ 1.4923
5-methyl-3-furylmethyl, B.P. 103°/5×$10^{-3}$ mm., $n_D^{20}$ 1.4913
2,5-dimethyl-3-furylmethyl, B.P. 109–111°/6×$10^{-3}$ mm., $n_D^{20}$ 1.4917
4,5-dimethylfurfuryl, B.P. 120–126°/7×$10^{-2}$ mm., $n_D^{20}$ 1.4962
3,5-dimethyl-furfuryl, B.P. 108–109°/5×$10^{-2}$ mm., $n_D^{20}$ 1.4950
5-benzylfurfuryl, B.P. 161–162.5°/1.6×$10^{-2}$ mm., $n_D^{20}$ 1.5342
5-p-xylylfurfuryl, B.P. 150.5–151.5°/$10^{-2}$ mm., $n_D^{20}$ 1.5320
5-benzyl-2-methyl-3-furylmethyl, B.P. 179°/7×$10^{-3}$ mm., $n_D^{20}$ 1.5305
4-benzyl-5-methylfurfuryl, B.P. 170–172°/2.3×$10^{-2}$ mm., $n_D^{20}$ 1.5340
2,4,5-trimethyl-3-furylmethyl, B.P. 116–118°/3×$10^{-3}$ mm.,
5-benzyl-3-methylfurfuryl, B.P. 160°/1×$10^{-2}$ mm., $n_D^{20}$ 1.5280

Transesterification of 5-benzyl-3-furylmethyl alcohol and ethyl chrysanthemate

EXAMPLE 4

Sodium (0.1 g.) is added in 5 portions over a period of three hours to a mixture of 5-benzyl-3-furylmethyl alcohol (4.5 g.), ethyl chrysanthemate (4.7 g.) and toluene refluxed in the dark in nitrogen. When reaction is complete, ether is added, the product was shaken with water, dried and then evaporated and distilled. After removing some ethyl chrysanthemate and unchanged alcohol, 5-benzyl-3-furylmethyl chrysanthemate (3.7 g.) is obtained B.P. 165–175°/8×$10^{-3}$ mm., $n_D^{20}$ 1.5316 which is identical by NMR spectrum with material obtained according to Example 1 using the acid chloride and which crystallizes on seeding with an authentic sample.

EXAMPLE 5

Sodium (0.15 g.) is added to a mixture of toluene (50 ml.) and ethanol (5 ml.) refluxed in the dark in nitrogen. When no sodium remains undissolved, excess alcohol is distilled off, the product cooled and then 5-benzyl-3-furylmethyl alcohol (5.26 g.) and ethyl chrysanthemate (5.48 g.) in toluene (15 ml.) added. The mixture is refluxed for 45 min., with co-distillation of the ethanol evolved with toluene, then cooled and ether added. The product is washed with water, dried ($Na_2SO_4$) evaporated and distilled to give ethyl chrysanthemate B.P. 60–120°/3×$10^{-2}$ mm. (0.3 g.), $n_D^{20}$ 1.4916, 5 benzyl-3-furylmethyl alcohol B.P. 120–170°/2×$10^{-2}$ mm. (1.1 g.), $n_D^{20}$ 1.5340, —1.5340, and 5-benzyl-3-furylmethyl chrysanthemate B.P. 170–185°/2×$10^{-2}$ mm., $n_D^{20}$ 1.5305; 6.05 g., equivalent to a yield of 80 based on unrecovered alcohol.

Insecticidal esters are prepared containing esters of the general Formula I having components in the following proportions.

EXAMPLE 6

Oil-based liquid spray for household insects

| | Percent |
|---|---|
| 5 - benzyl - 3 - furylmethyl - (±) - cis-trans-chrysanthemate (w./v.) | 0.005 |
| 25% pyrethrum extract | 0.25 |
| Piperonyl butoxide | 0.5 |
| Antioxidant, e.g. Topanol A. | 0.1 |
| Odorless light oil solvent, e.g. xylene to make 100 vols. | |

EXAMPLE 7

Water-based liquid spray concentrate for mosquito control

| | Percent |
|---|---|
| 5 - benzyl - 3 - furylmethyl - (±) - cis-trans-chrysanthemate (w./v.) | 0.25 |
| Piperonyl butoxide | 1.0 |
| Non-ionic emulsifier, e.g. Ethylan BCP | 0.25 |
| Antioxidant, e.g. Topanol A. | 0.1 |
| Water to make 100 vols. | |

This concentrate should be diluted 1:80 with water before spraying.

EXAMPLE 8

Aerosol

| | Percent |
|---|---|
| 5 - benzyl - 3 - furylmethyl-(±)-cis-trans-chrysanthemate (w./v.) | 0.02 |
| 25% Pyrethrum extract | 0.8 |
| Piperonyl butoxide | 1.5 |
| Odorless petroleum distillate (B.P. 200–265°) | 17.38 |
| Propellant, e.g. a mixture of equal quantities of trichloromonofluoromethane and dichlorodifluoromethane | 80.0 |
| Perfume | 0.2 |
| Antioxidant, e.g. topanol A. | 0.1 |

EXAMPLE 9

Mosquito coil

| | Percent |
|---|---|
| 5 - benzyl - 3 - furylmethyl-(±)-cis-trans-chrysanthemate (w./v.) | 0.25 |
| Tabu powder or Staragel No. 1 | 30.0 |
| Filler(s), e.g. wood flour, powdered leaves or nut shells | 68.75 |
| Brilliant green | 0.5 |
| p-Nitrophenol | 0.5 |

EXAMPLE 10

Emulsifiable concentrate

| | Percent |
|---|---|
| 5 - benzyl - 3 - furylmethyl - (±) - cis - trans-chrysanthemate (w./v.) | 1.5 |
| Non-ionic emulsifier, e.g. Ethylan BCP | 25.0 |
| Xylene | 73.4 |
| Antioxidant, e.g. Topanol A. | 0.1 |

This concentrate may then be diluted at the rate of 30 mls. to 4½ litres of water prior to use.

EXAMPLE 11

General purpose powder for household, garden, livestock, or grain storage use

| | Percent |
|---|---|
| 5 - benzyl - 3 - furylmethyl - (±) - cis - trans-chrysanthemate (w./v.) | 0.005 |
| Tropital | 0.25 |
| Antioxidant, e.g. BHT or BHA | 0.03 |
| Filler, e.g. Talc BPC | 99.67 |

In the compositions described in Examples 5–10 the active component 5-benzyl-3-furylmethyl-(±)-cis-trans-chrysanthemate may be replaced completely or in part by an equivalent amount of any of the other esters of the general Formula I, for example by 5-benzyl-3-furylmethyl-(+)-transpyrethrate which has a particularly good knock-down effect on housefles and such other compounds can advantageously be included in the compositions above as can other known insecticides which are compatible with the pyrethroids of Formula I.

Insecticidal activity

In contact toxicity tests in which insects were treated with measured drops of the insecticides dissolved in acetone, against house-flies (adult female *Musca domestica* L.),5-benzyl-3-furylmethyl - (±) - cis-trans-chrysanthemate was more than twenty times as toxic as the mixture of natural pyrethrins and nearly five times more toxic than the most toxic pyrethrin-like ester previously known, 4-allyl-2,6-dimethylbenzyl - (±) - cis-trans-chrysanthemate. It was more than ten times more toxic than allethrin to house-flies. By a similar method of testing, to mustard beetles (adult *Phaedon cochlearae* Fab.), 5-benzyl-3-furylmethyl-(±)-cis-trans-chrysanthamate was twice as toxic as the mixture of natural pyrethrins, sixteen times more toxic than 4-allyl-2,6-dimethylbenzyl-(±)-cis-trans-chrysanthemate and thirty-two times more toxic than allethrin. Although 5-benzyl-2-methyl-3-furfuryl - (±) - cis-trans-chrysanthemate was one half to one third as toxic as the unmethylated 3-furfuryl ester, because of the high activity of this compound, this 2-methyl-3-furfuryl ester still has a most useful level of insecticidal activity.

Toxicities relative to natural pyrethrin and certain synthetic pyrethroids and other insecticides are shown below:

| | Relative toxicity | |
|---|---|---|
| Compound | Mustard beetles | House flies |
| 5-benzyl-3-furymethyl (±)-trans-chrysanthemate | 260 | 250 |
| 5-benzyl-3-furylmethyl (±)-trans-pyrethrate | 160 | 25 |
| 5-benzyl-3-furylmethyl (±)-trans-chrysanthemate | 150 | 130 |
| Pyrethrin I | 120 | |
| 5-benzyl-3-furylmethyl (±)-cis-trans-chrysanthemate | 100 | 100 |
| Naturl pyrethrins | 51 | 4.6 |
| 5-benzyl-2-methyl-3-furylmethyl (±)-cis-trans-chrysanthemate | 40 | 46 |
| Diazinon (O,O-dimethyl-O-2-isopropyl-4-methyl-6-pyridinimyl-phosphothioate) | | 42 |
| Pyrethrin II | 40 | |
| Parathion (O,O-dimethyl-O-p-nitrophenyl-phosphothioate) | 21 | 85 |
| 4-allyl-2,6-dimethylbenzyl (±)-cis-trans-chrysanthemate | 6.2 | 20 |
| 5-benzylfurfuryl (±)-cis-trans-chyrsanthemate | 4.6 | 11 |
| Allethrin | 3.1 | 5.0 |
| 4-benzylbenzyl (±)-cis-trans-chrysanthemate | 2.2 | 2.4 |
| 4-furfurylbenzyl (±)-cis-trans-chrysanthemate | 1.2 | 1.0 |
| 4-benzyl-5-methylfurfuryl (±)-cis-trans-chrysanthemate | 0.5 | 2.7 |
| 5-benzyl-3-methylfurfuryl (±)-cis-trans-chrysanthemate | | 3.9 |
| 4,5-dimethylfurfuryl (±)-cis-trans-chrysanthemate | | 1.4 |

The greatest figure indicates the highest toxicity. Toxicities are related to 5-benzyl-3-furylmethyl-(±)-cis-trans-chrysanthemate, which is given an arbitrary rating of 100.

What is claimed is:

1. A compound of the formula:

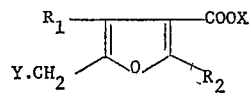

wherein $R_1$ and $R_2$ are each hydrogen or $C_1$–$C_4$ lower alkyl,
Y is phenyl or $C_1$–$C_4$ lower alkyl phenyl, and
X is hydrogen or $C_1$–$C_4$ lower alkyl.

2. The compound of claim 1 which is lower alkyl 5-benzyl-3-furoate.

3. The compound methyl 5-benzyl-3-furoate.

References Cited

Justoni et al.—Chemical Abstracts (1948), vol. 43, pp. 2936–38.

Lacey—Chemical Abstracts (1955), vol. 49, pp. 8940–42.

Hanson et al.—J. Chem. Society, November 1965, pp. 5984–88.

Goldfarb et al.—Chemical Abstracts, Dec. 6, 1965, vol. 63, p. 16286.

ALEX MAZEL, Primary Examiner

B. I. DENTZ, Assistant Examiner

U.S. Cl. X.R.

260—347.3; 424—285